US011746676B1

United States Patent
(12) Munkres et al.

(10) Patent No.: US 11,746,676 B1

(45) Date of Patent: Sep. 5, 2023

(54) THRUST BEARING ASSEMBLY

(71) Applicant: General Electric Company, Schenectady, NY (US)

(72) Inventors: Chad D. Munkres, Schenectady, NY (US); Luis Antonio Nuñez Cruz, Querétaro (MX); Edward Dewhurst, Schenectady, NY (US); James A. Gruner, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/167,971

(22) Filed: Feb. 13, 2023

(51) Int. Cl.
*F01D 25/18* (2006.01)
*F01D 25/16* (2006.01)

(52) U.S. Cl.
CPC ............. *F01D 25/18* (2013.01); *F01D 25/16* (2013.01); *F05D 2240/52* (2013.01); *F05D 2260/98* (2013.01)

(58) Field of Classification Search
CPC ...... F01D 25/18; F01D 25/16; F05D 2240/52; F05D 2260/98
See application file for complete search history.

(56) References Cited

U.S. PATENT DOCUMENTS

| | | | |
|---|---|---|---|
| 6,746,152 B2 | 6/2004 | Branagan | |
| 8,408,801 B2 | 4/2013 | Waki et al. | |
| 9,482,274 B2 | 11/2016 | Ertas et al. | |
| 10,801,549 B2 | 10/2020 | Ertas et al. | |
| 10,871,072 B2 | 12/2020 | Mehra | |
| 2011/0123327 A1 | 5/2011 | Dewhurst et al. | |
| 2012/0099993 A1* | 4/2012 | Guerenbourg .......... | F16C 35/02 384/114 |

FOREIGN PATENT DOCUMENTS

| | | | |
|---|---|---|---|
| CA | 3083693 A1 | | 6/2019 |
| CN | 106640976 A | * | 5/2017 |
| CN | 207583836 U | * | 7/2018 |
| CN | 108571516 A | * | 9/2018 |
| CN | 113775642 A | * | 12/2021 |
| CN | 113790206 A | * | 12/2021 |
| JP | 2000169697 A | | 6/2000 |
| JP | 2006342926 A | * | 12/2006 |
| JP | 2011169355 A | | 9/2011 |
| WO | 2010098003 A1 | | 9/2010 |

OTHER PUBLICATIONS

CN-113775642-A (Year: 2021) translation.*
CN-113790206-A (Year: 2021) translation.*
CN-108571516-A (Year: 2018) translation.*
CN-207583836-U (Year: 2018) translation.*
CN-106640976-A (Year: 2017) translation.*
JP-2006342926-A (Year: 2006) translation.*

* cited by examiner

*Primary Examiner* — Mickey H France

(74) *Attorney, Agent, or Firm* — Eversheds Sutherland (US) LLP

(57) ABSTRACT

The present application provides a thrust pad assembly for a turbomachine. The thrust pad assembly may include a thrust pad machining with an insert flange, a polymer liner positioned within the insert flange, and an oil feed configuration. The oil feed configuration includes one or more oil output ports extending through the thrust pad machining and an oil feed groove in the polymer liner.

20 Claims, 4 Drawing Sheets

100
110
180
200
190
120
170
230
240
210
220
250
160
150
260
140
190
280
130

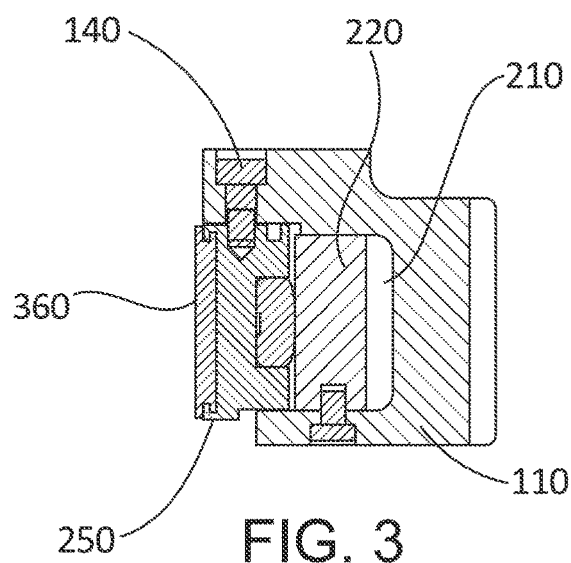
FIG. 3
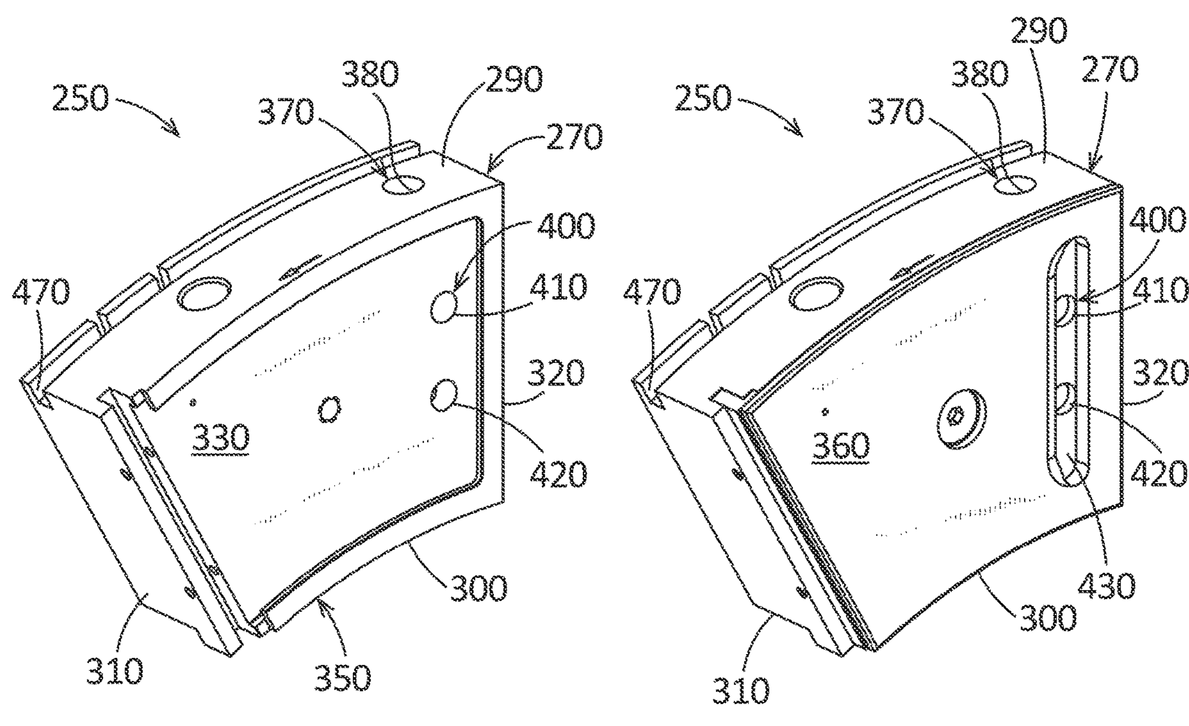
FIG. 4
FIG. 5

THRUST BEARING ASSEMBLY

TECHNICAL FIELD

The present application and the resultant patent relate generally to turbomachinery, rotating machinery, and the like and more particularly relate to a thrust bearing assembly having a number of thrust pad assemblies each with a polymer liner and a front face oil output port thereon.

BACKGROUND

Generally described, turbomachinery such as steam turbines, gas turbines, and the like, include rotor assemblies having a shaft supported by radial bearings and thrust bearings. The radial bearings absorb radial forces and the thrust bearings absorb axial forces. The bearing assemblies sustain and support these forces while permitting efficient rotation of the rotor assembly. By way of example, the axial forces may be generated from internal pressures between the stages of the turbomachinery and the thrust therein.

Known thrust bearing assemblies have used either radial grooves on the front face of a thrust pad that allow oil to enter and lubricate the pad or a removable polymer pad as the bearing liner material. The radial grooves have been used successfully in, for example, white metal babbitted thrust bearings to supply new, cool oil directly to the pads. The flow is more directed than a flooded bearing feed and results in lower pad temperatures and reduced losses from oil churn between the thrust pads. A bonded polymer pad may be used in place of the white metal as the liner material but a radial edge groove has not been used with such a polymer pad due to concerns about overall bond integrity. As a result, the polymer thrust bearings generally are fed oil using a flooded or a spray bar design. The spray bar design is efficient, but requires more parts and cost. The flooded design is less expensive but not as efficient.

SUMMARY

The present application and the resultant patent thus provide a thrust pad assembly for a turbomachine. The thrust pad assembly may include a thrust pad machining with an insert flange, a polymer liner positioned within the insert flange, and an oil feed configuration. The oil feed configuration includes one or more oil output ports extending through the thrust pad machining and an oil feed groove in the polymer liner.

The present application and the resultant patent further provide a method of lubricating a thrust pad assembly of a thrust bearing assembly with a flow of oil. The method may include the steps of flowing the flow of oil through an oil plenum in a thrust casing machining, flowing the flow of oil from the oil plenum to an oil feed configuration of the thrust pad assembly, and flowing the flow of oil through the oil feed configuration and through an oil feed groove in a polymer liner of the thrust pad assembly.

The present application and the resultant patent further provide a thrust bearing assembly for a turbomachine. The thrust bearing assembly may include a thrust casing machining, a number of oil plenums, and a number of thrust pad assemblies positioned in the thrust casing machining. Each of the thrust pad assemblies may include an insert flange with a polymer liner therein and an oil feed configuration. The oil feed configuration may include one or more oil output ports extending through an oil feed groove in the polymer liner.

These and other features and improvements of this application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a side sectional view of the thrust bearing assembly of FIG. 2.

FIG. 4 is a perspective view of a thrust pad assembly of the thrust bearing assembly of FIG. 2 without a polymer liner on a front face thereof.

FIG. 5 is a perspective view of a thrust pad assembly of the thrust bearing assembly of FIG. 2 with a polymer liner on a front face thereof.

DETAILED DESCRIPTION

Figure 1:
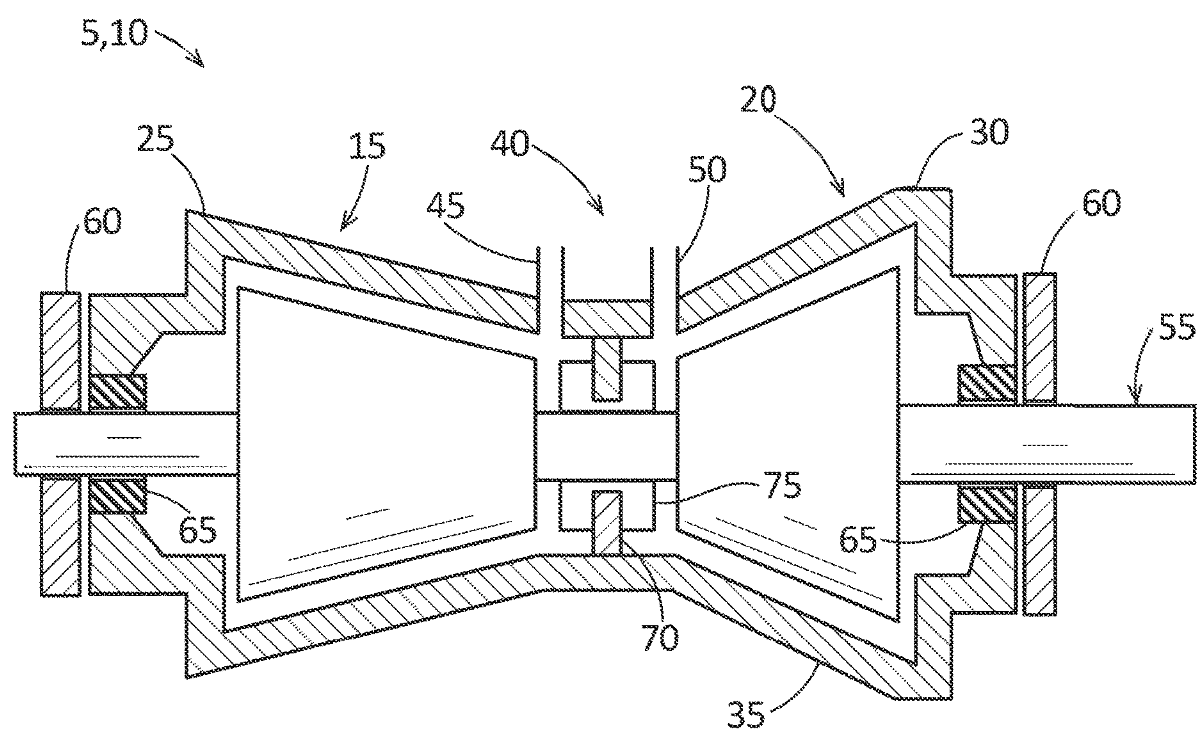
FIG. 1 is a schematic diagram of an exemplary steam turbine engine with a number of pressure sections, a rotor shaft, and a number of bearing assemblies.

Referring now to the drawings, in which like numerals refer to like elements throughout the several views, FIG. 1 shows a schematic diagram of an example of a turbomachine 5, in this case a steam turbine 10. Generally described, the steam turbine 10 may include a high pressure section 15 and an intermediate pressure section 20. Other pressures in other sections also may be used herein. An outer shell or casing 25 may be divided axially into an upper half section 30 and a lower half section 35. A central section 40 of the casing 25 may include a high pressure steam inlet 45 and an intermediate pressure steam inlet 50. Within the casing 25, the high pressure section 15 and the intermediate pressure section 20 may be arranged about a rotor shaft 55. The rotor shaft 55 may be supported by a number of thrust bearings 60 and journal bearings 65. An annular section divider 70 may extend radially inward from the central section 40 towards the rotor shaft 55. The divider 70 may include a number of packing casings 75. Other components and other configurations may be used.

During operation, the high pressure steam inlet 45 receives high pressure and high temperature steam from a steam source. The steam may be routed through the high pressure section 15 such that work is extracted from the steam by rotation of the rotor shaft 55. The steam exits the high pressure section 15 and then may be returned to the steam source for reheating. The reheated steam then may be rerouted to the intermediate pressure steam inlet 50. The steam may be returned to the intermediate pressure section 20 at a reduced pressure as compared to the steam entering the high pressure section 15 but at a temperature that is approximately equal to the temperature of the steam entering the high pressure section 15. Other components and other configurations may be used herein.

Figure 2:
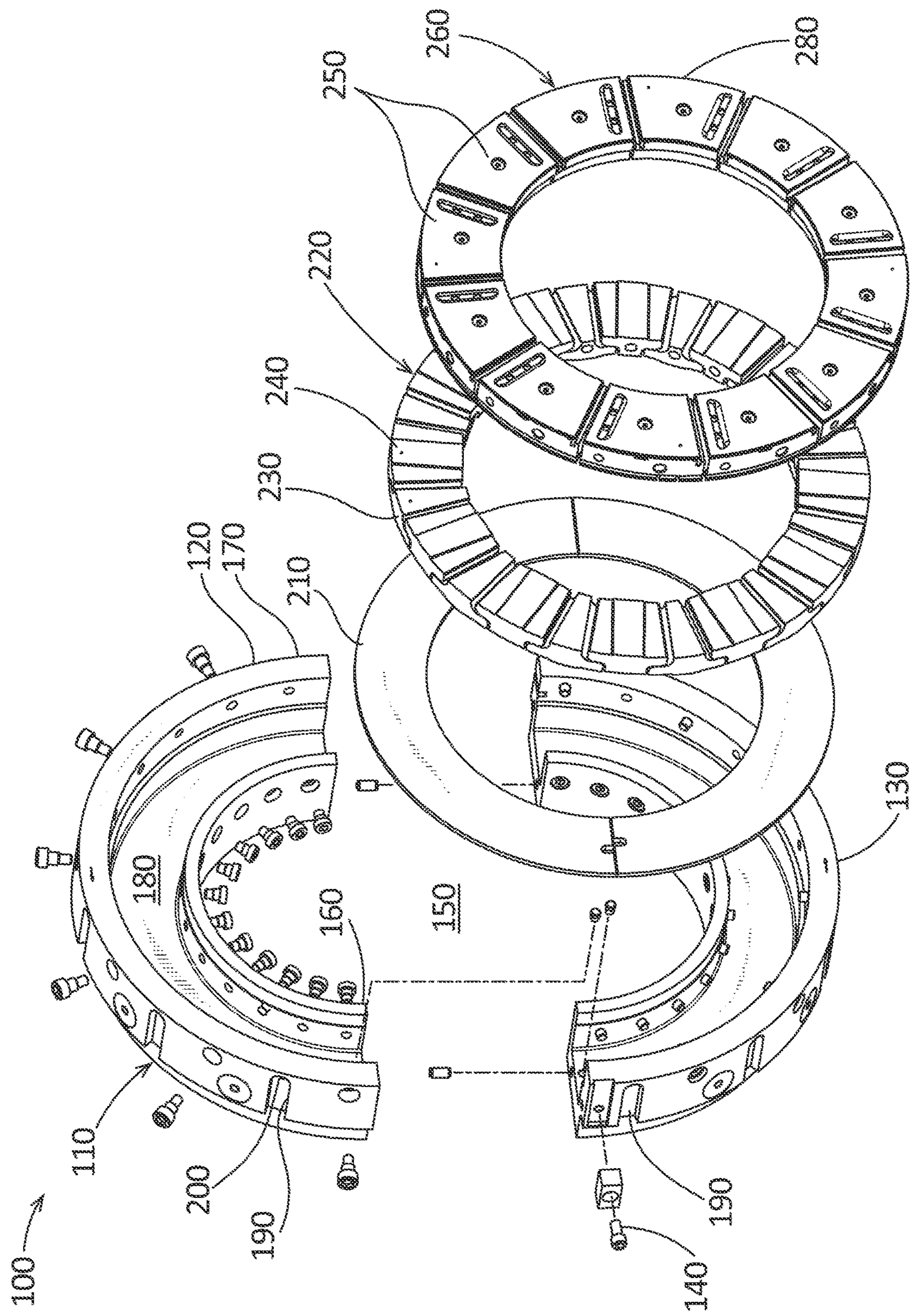
FIG. 2 is an exploded view of a thrust bearing assembly as may be described herein.

FIGS. 2 and 3 show a thrust bearing assembly 100 as may be described herein. The thrust bearing assembly 100 may include a thrust casing machining 110. The thrust casing machining 110 may include a first half 120 and a second half 130. The first half 120 and the second half 130 may be joined via a number of anti-rotation pins 140 and the like. Other types of joinder devices may be used herein. The thrust casing machining 110 may define an inner aperture 150 for the rotor shaft 55 to extend therethrough. The thrust casing machining 110 may have an inner wall 160 defining the inner aperture 150, an outer wall 170, and a recess 180 therebetween. The recess 180 may be sized to accept the remaining components of the thrust casing machining 110 therein as will be described in more detail below. The outer wall 170 radially encloses the thrust casing machining 110. The outer wall 170 includes a number of oil plenums 190 formed therein with each of the oil plenums 190 having an oil aperture 200 extending therethrough. The oil plenums 190 may be formed in the shape of elongated slots with the oil aperture 200 at one end. Other components and other configurations may be used herein.

The thrust bearing assembly 100 includes a shim 210 sized for and positioned within the recess 180 of the thrust casing machining 110. Adjacent to the shim 210 may be a number of leveling links 220. Specifically, a number of lower leveling links 230 positioned on the shim 210 and a number of interfacing upper leveling links 240 positioned, as will be described below, adjacent to a number of thrust pad assemblies 250. The leveling links 220 may be of conventional design. The respective leveling links 220 may push up and down to ensure proper alignment and load equalization of the thrust pad assemblies 250. The thrust bearing assembly 100 includes the thrust pad assemblies 250 assembled in a thrust pad assembly loop 260. Any number of the thrust pad assemblies 250 may be used herein. Other components and other configurations may be used herein.

FIGS. 4-8 show examples of the thrust pad assemblies 250. As is shown in FIG. 4, each thrust pad assembly 250 includes a thrust pad machining 270. Each thrust pad machining 270 is a shaped as a segment 280 of the thrust pad assembly loop 260 with a curved outer diameter 290, a curved inner diameter 300, a trailing edge 310, a leading edge 320, a flat front face 330, and a flat rear face 340. The front face 330 is surrounded by an insert flange 350 extending along the outer diameter 290, the leading edge 320, and the inner diameter 300. As is shown in FIG. 5, the insert flange 350 allows a polymer liner 360 to be slid in and out via the trailing edge 310 and to be mechanically retained therein. The polymer liner 360 may be at least partly of made of polyetheretherketone (PEEK), polytetrafluroethylene (PTFE), and other types of polymers and blends thereof. Other types of materials may be used herein. The polymer liner 360 may be removed and replaced. Other components and other configurations may be used herein.

Figure 6:
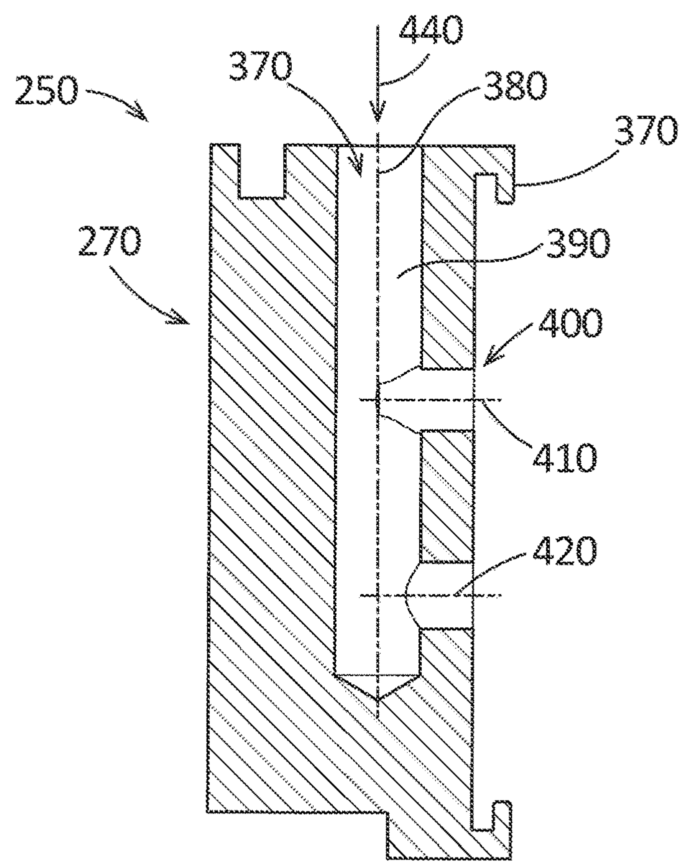
FIG. 6 is a side sectional view of the thrust pad assembly of FIG. 4.

As is shown in FIGS. 4-6, each thrust pad assembly 250 includes an oil feed configuration 370. The oil feed configuration 370 may include an oil input port 380 on the outer diameter 290, an oil feed channel 390 extending within the thrust pad machining 270, and a number of oil output ports 400 on the front face 330. In this example, a first oil output port 410 and a second oil output port 420 are shown although any number of the oil output ports 400 may be used herein. The oil feed configuration 370 also includes an oil feed groove 430 formed in the polymer liner 360. The oil feed groove 430 may be sized and shaped to surround at least in part the oil output ports 400. The oil input port 380 may align with the oil plenum 190 of the thrust casing machining 110 such that a flow of oil 440 may extend therethrough. Other components and other configurations may be used herein.

Figure 7:
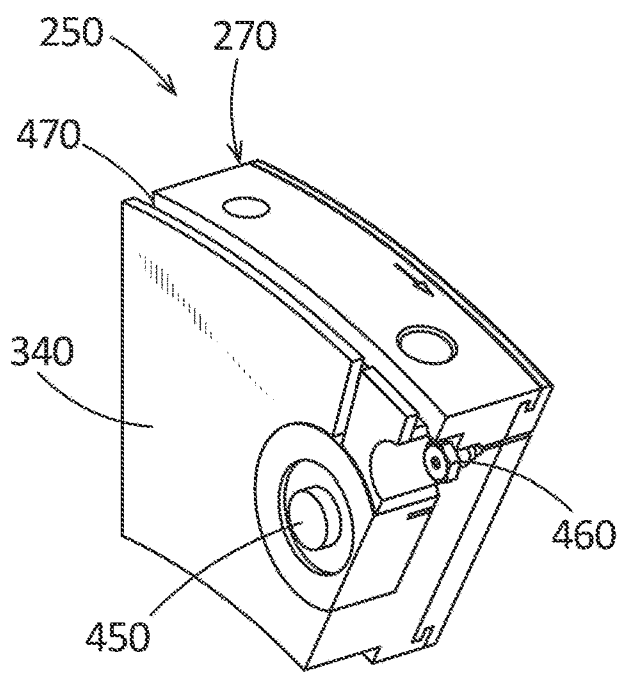
FIG. 7 is a perspective view of a thrust pad assembly of the thrust bearing assembly of FIG. 2 with a load cell on a rear face thereof.
Figure 8:
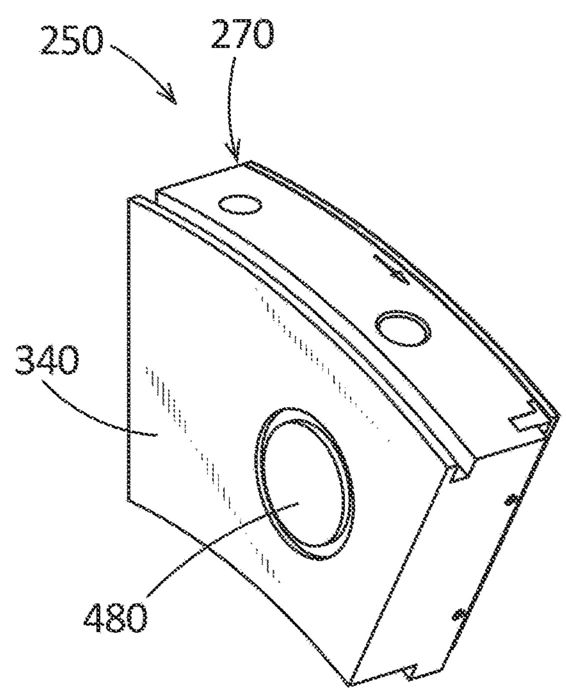
FIG. 8 is a perspective view of a thrust pad assembly of the thrust bearing assembly of FIG. 2 with a plug on a rear face thereof.

As is shown in FIGS. 7 and 8, some of the thrust pad assemblies 250 in the thrust pad assembly loop 260 may include a load cell 450 positioned along the rear face 340. The load cell 450 may be a TC series (tension/compression) load cell such as a strain gauge transducer used to measure loads in static and dynamic applications, in tension and compression, with high accuracy. Other types of load cells 450 may be used herein. Any number of temperature sensors also may be used. As is shown in FIG. 7, the load cell 450 may be positioned within the rear face 340 and locked into place via a compression fitting 460 and the like. The outer diameter 290 may have a wiring channel 470 formed therein to accommodate the wiring of the load cell 450. FIG. 8 shows a thrust pad assembly 250 without the load cell 450. Instead, a plug 480 may be positioned therein. Other components and other configurations may be used herein.

In use, the flow of oil 440 may flow from the oil plenums 190 of the thrust casing machining 110 and into the oil feed configurations 370 of the thrust pad assemblies 250. The flow of oil 440 may flow into the oil input port 380, through the oil feed channel 390, out via the oil output ports 400 and the oil feed groove 430, and onto the polymer liner 360 for lubrication.

The use of the separate thicker polymer liner 360 that is mechanically retained (not bonded) within the insert flange 350 allows the thrust pad assembly 250 to use the oil feed groove 430 without the concern of bond integrity. The thrust pad assembly 250 combines this with the oil feed configuration 370 to connect the oil feed groove 430 with the oil plenums 190 of the thrust casing machining 110. As a result, the overall thrust bearing assembly 100 may have a lower part count with reduced power losses. Specifically, the thrust bearing assembly 100 reduces power losses as compared to a flooded design and reduces cost and complexity as compared to a spray bar oil feed design. The use of the oil feed groove 430 on the front face 330 also reduces the space required between the thrust pad assemblies 250, thus increasing the load carrying area for the same size thrust casing machining 110.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A thrust pad assembly for a turbomachine, comprising: a thrust pad machining; the thrust pad machining comprising an insert flange; a polymer liner positioned within the insert flange; and an oil feed configuration; the oil feed configuration comprising one or more oil output ports extending through the thrust pad machining and an oil feed groove in the polymer liner.

2. The thrust pad assembly of clause 1, wherein the thrust pad machining comprises a front face and a rear face.

3. The thrust pad assembly of any preceding clause, wherein the polymer liner is positioned on the front face.

4. The thrust pad assembly of any preceding clause, wherein the thrust pad machining further comprises an outer diameter, an inner diameter, a trailing edge, and a leading edge.

5. The thrust pad assembly of any preceding clause, wherein the insert flange extends along the outer diameter, the leading edge, and the inner diameter of the front face.

6. The thrust pad assembly of any preceding clause, wherein the polymer liner is inserted into the insert flange along the trailing edge of the front face.

7. The thrust pad assembly of any preceding clause, wherein the oil feed configuration comprises an oil input port in the outer diameter.

8. The thrust pad assembly of any preceding clause, wherein the oil feed configuration comprises an oil feed channel in communication with the oil input port and the one or more oil output ports.

9. The thrust pad assembly of any preceding clause, wherein the one or more oil output ports comprise a first oil output port and a second oil output port.

10. The thrust pad assembly of any preceding clause, wherein the thrust pad machining comprises a load cell on the rear face.

11. The thrust pad assembly of any preceding clause, wherein the load cell is held on place by a compression fitting.

12. The thrust pad assembly of any preceding clause, wherein the outer diameter comprises a wiring channel in communication with the load cell.

13. The thrust pad assembly of any preceding clause, wherein the thrust pad machining comprises a plug on the rear face.

14. The thrust pad assembly of any preceding clause, further comprising a flow of oil extending through the oil configuration to the polymer liner.

15. A method of lubricating a thrust pad assembly of a thrust bearing assembly with a flow of oil, comprising: flowing the flow of oil through an oil plenum in a thrust casing machining; flowing the flow of oil from the oil plenum to an oil feed configuration of the thrust bearing assembly; and flowing the flow of oil through the oil feed configuration and through an oil feed groove in a polymer liner of the thrust pad assembly.

16. A thrust bearing assembly for a turbomachine, comprising: a thrust casing machining; the thrust casing machining comprises a plurality of oil plenums; and a plurality of thrust pad assemblies positioned in the thrust casing machining; wherein each of the plurality of thrust pad assemblies comprises an insert flange with a polymer liner therein and an oil feed configuration; and wherein the oil feed configuration comprising one or more oil output ports extending through an oil feed groove in the polymer lining.

17. The thrust bearing assembly of any preceding clause, wherein each of the plurality of thrust pad assemblies comprise a front face and a rear face.

18. The thrust bearing assembly of any preceding clause, wherein the polymer liner is positioned on the front face.

19. The thrust bearing assembly of any preceding clause, wherein the oil feed configuration of each of the plurality of thrust pad assemblies comprises an oil input port in communication with one of the plurality of oil plenums of the thrust casing machining.

20. The thrust pad bearing of any preceding clause, wherein the rear face of one or more of the plurality of thrust bearing assemblies comprises a load cell.

All embodiments in the clauses can be combined with each other in any order or combination.

We claim:

1. A thrust pad assembly for a turbomachine, comprising:
- a thrust pad machining;
- the thrust pad machining comprising an insert flange;
- a polymer liner positioned within the insert flange; and
- an oil feed configuration;
- the oil feed configuration comprising one or more oil output ports extending through the thrust pad machining and an oil feed groove in the polymer liner.

2. The thrust pad assembly of claim 1, wherein the thrust pad machining comprises a front face and a rear face.

3. The thrust pad assembly of claim 2, wherein the polymer liner is positioned on the front face.

4. The thrust pad assembly of claim 2, wherein the thrust pad machining further comprises an outer diameter, an inner diameter, a trailing edge, and a leading edge.

5. The thrust pad assembly of claim 4, wherein the insert flange extends along the outer diameter, the leading edge, and the inner diameter of the front face.

6. The thrust pad assembly of claim 5, wherein the polymer liner is inserted into the insert flange along the trailing edge of the front face.

7. The thrust pad assembly of claim 4, wherein the oil feed configuration comprises an oil input port in the outer diameter.

8. The thrust pad assembly of claim 7, wherein the oil feed configuration comprises an oil feed channel in communication with the oil input port and the one or more oil output ports.

9. The thrust pad assembly of claim 1, wherein the one or more oil output ports comprise a first oil output port and a second oil output port.

10. The thrust pad assembly of claim 2, wherein the thrust pad machining comprises a load cell on the rear face.

11. The thrust pad assembly of claim 10, wherein the load cell is held on place by a compression fitting.

12. The thrust pad assembly of claim 10, wherein the outer diameter comprises a wiring channel in communication with the load cell.

13. The thrust pad assembly of claim 2, wherein the thrust pad machining comprises a plug on the rear face.

14. The thrust pad assembly of claim 1, further comprising a flow of oil extending through the oil feed configuration to the polymer liner.

15. A method of lubricating a thrust pad assembly of a thrust bearing assembly with a flow of oil, comprising:
- flowing the flow of oil through an oil plenum in a thrust casing machining;
- flowing the flow of oil from the oil plenum to an oil feed configuration of the thrust pad assembly; and
- flowing the flow of oil through the oil feed configuration and through an oil feed groove in a polymer liner within an insert flange of the thrust pad assembly.

16. A thrust bearing assembly for a turbomachine, comprising:
- a thrust casing machining;
- the thrust casing machining comprises a plurality of oil plenums; and
- a plurality of thrust pad assemblies positioned in the thrust casing machining;
- wherein each of the plurality of thrust pad assemblies comprises an insert flange with a polymer liner therein and an oil feed configuration; and
- wherein the oil feed configuration comprising one or more oil output ports extending through an oil feed groove in the polymer liner.

17. The thrust bearing assembly of claim 16, wherein each of the plurality of thrust pad assemblies comprise a front face and a rear face.

18. The thrust bearing assembly of claim 17, wherein the polymer liner is positioned on the front face.

19. The thrust bearing assembly of claim 16, wherein the oil feed configuration of each of the plurality of thrust pad assemblies comprises an oil input port in communication with one of the plurality of oil plenums of the thrust casing machining.

20. The thrust bearing assembly of claim 17, wherein the rear face of one or more of the plurality of thrust bearing assemblies comprises a load cell.

* * * * *